United States Patent
Chennakeshu et al.

(10) Patent No.: US 6,493,322 B1
(45) Date of Patent: *Dec. 10, 2002

(54) SATELLITE DIVERSITY SCHEME

(75) Inventors: Sandeep Chennakeshu, Cary, NC (US); Amer A. Hassan, Cary, NC (US); Barbara Molnar, Cary, NC (US); Karl Molnar, Cary, NC (US); Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/840,268

(22) Filed: Apr. 14, 1997

Related U.S. Application Data

(63) Continuation of application No. 08/574,141, filed on Dec. 18, 1995, now Pat. No. 5,661,724.

(51) Int. Cl.[7] .............................. H04J 3/14; H04Q 7/00
(52) U.S. Cl. ..................... 370/252; 370/331; 370/336
(58) Field of Search .............................. 370/331, 332, 370/333, 350, 337, 314, 315, 316, 321, 324, 347, 329, 252; 455/436–444

(56) References Cited

U.S. PATENT DOCUMENTS

| | | | | |
|---|---|---|---|---|
| 5,054,035 A | * | 10/1991 | Tarallo et al. | 375/225 |
| 5,239,294 A | * | 8/1993 | Flanders et al. | 340/825.34 |
| 5,258,980 A | * | 11/1993 | Maebara et al. | 370/347 |
| 5,276,906 A | * | 1/1994 | Felix | 455/33.2 |
| 5,444,696 A | | 8/1995 | Petranovich | 370/337 |
| 5,499,387 A | * | 3/1996 | Chambert | 455/436 |
| 5,546,464 A | | 8/1996 | Raith et al. | 380/172 |
| 5,594,943 A | * | 1/1997 | Balachandran | 455/436 |
| 5,661,724 A | * | 8/1997 | Chennakeshu et al. | 370/324 |
| 5,758,266 A | * | 5/1998 | Kornfeld et al. | 455/86 |
| 5,883,888 A | * | 3/1999 | St-Pierre | 370/331 |
| 5,913,167 A | * | 6/1999 | Bonta et al. | 455/436 |
| 5,915,221 A | * | 6/1999 | Sawyer et al. | 455/437 |
| 6,044,272 A | * | 3/2000 | Kobylinski et al. | 455/437 |

FOREIGN PATENT DOCUMENTS

| | | |
|---|---|---|
| EP | 0 288 904 A | 11/1988 |
| EP | 0 365 885 A | 5/1990 |
| EP | 0 439 630 A | 8/1991 |
| EP | 0 448 015 A | 9/1991 |
| EP | 0 637 142 A | 1/1995 |
| WO | 94/13113 | 6/1994 |

OTHER PUBLICATIONS

Hodges, Martin, "The GSM radio interface", Br Telecom Techol J vol. 8 No. 1 Jan. 1990, pp. 31–43.

* cited by examiner

*Primary Examiner*—Chau Nguyen
*Assistant Examiner*—Soon-Dong Hyun
(74) *Attorney, Agent, or Firm*—Coats & Bennett, P.L.L.C.

(57) ABSTRACT

A diversity scheme for allowing a transmitter/receiver, such as a mobile unit in a mobile telecommunications system, to exchange communication signals with more than one control station, such as a base station or satellite. According to an exemplary embodiment of the diversity scheme, the mobile unit scans for the control channel of a second satellite during idle time slots while communicating with a first satellite during active time slots. Once the mobile unit detects a control channel from a second satellite, the mobile unit stores synchronization information and establishes a communication link with the second satellite if shadowing or other severe fading causes signal quality over a communication link established with a first satellite to fall below a threshold level. The diversity scheme also allows the mobile unit to communicate simultaneously with two satellites, using alternate TDMA frames.

24 Claims, 4 Drawing Sheets

SATELLITE DIVERSITY SCHEME

This application is a continuation, of application Ser. No. 08/574,141, now U.S. Pat. No. 5,661,724 filed Dec. 18, 1995.

FIELD OF THE INVENTION

The present invention generally relates to mobile communications. More particularly, the present invention relates to a satellite mobile communications method and system in which a mobile unit can selectively exchange signals with multiple satellites.

BACKGROUND OF THE INVENTION

Referring to FIG. 1, a typical cellular mobile radiocommunication system is shown. The typical system includes a number of base stations similar to base station 110 and a number of mobile units or stations similar to mobile 120. Voice and/or data communication can be performed using these devices or their equivalents. The base station includes a control and processing unit 130 which is connected to the MSC (mobile switching center) 140 which in turn is connected to the public switched telephone network (not shown).

The base station 110 serves a cell and includes a plurality of voice channels handled by voice channel transceiver 150 which is controlled by the control and processing unit 130. Also, each base station includes a control channel transceiver 160 which is typically capable of exchanging control signals on more than one control channel. The control channel transceiver 160 is controlled by the control and processing unit 130. The control channel transceiver 160 broadcasts control information over the control channel of the base station or cell to mobiles locked to that control channel. The voice channel transceiver broadcasts the traffic or voice channels which can include digital control channel location information.

When the mobile 120 first enters an idle mode, it periodically scans the control channels of base stations like base station 110 for the presence of a paging burst addressed to the mobile 120. The paging burst informs mobile 120 which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in U.S. patent application Ser. No. 07/967,027, now U.S. Pat. No. 5,745,523 entitled "Multi-Mode Signal Processing" filed on Oct. 27, 1992 to P. Dent and B. Ekelund, the entirety of which is incorporated herein by reference. It will be appreciated that the base station may be replaced by one or more satellites in a satellite-based mobile radiocommunication system.

To increase radiocommunication system capacity, digital communication and multiple access techniques such as Frequency Division Multiple Access (FDMA), Time Division Multiple Access (TDMA), and Code Division Multiple Access (CDMA) may be used. The objective of each of these multiple access techniques is to combine signals from different sources onto a common transmission medium in such a way that, at their destinations, the different channels can be separated without mutual interference. In a FDMA system, users share the radio spectrum in the frequency domain. Each user is allocated a part of the frequency band which is used throughout a conversation. In a TDMA system, users share the radio spectrum in the time domain. Each radio channel or carrier frequency is divided into a series of time slots, and individual users are allocated a time slot during which the user has access to the entire frequency band allocated for the system (wideband TDMA) or only a part of the band (narrowband TDMA). Each time slot contains a "burst" of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user. CDMA combines FDMA and TDMA. In a CDMA system, each user is assigned a unique pseudorandom user code to uniquely access the frequency time domain. Examples of CDMA techniques include spread spectrum and frequency hopping.

In a TDMA system, the successive time slots assigned to the same user, which are usually not consecutive time slots on the radio carrier, constitute the user's digital traffic channel, which is considered to be a logical channel assigned to the user. The organization of TDMA channels, using the GSM standard as an example, is shown in FIG. 2. The TDMA channels include traffic channels TCH and signalling channels SC. The TCH channels include full-rate and half-rate channels for transmitting voice and/or data signals. The signalling channels SC transfer signalling information between the mobile unit and the satellite (or base station). The signalling channels SC include three types of control channels: broadcast control channels (BCCHs), common control channels (CCCHs) shared between multiple subscribers, and dedicated control channels (DCCHs) assigned to a single subscriber. A BCCH typically includes a frequency correction channel (FCH) and a synchronization channel (SCH), both of which are downlink channels. The common control channels (CCCHs) include downlink paging (PCH) and access grant (AGCH) channels, as well as the uplink random access channel (RACH). The dedicated control channels DCCH include a fast associated control channel (FACCH), a slow associated control channel (SACCH), and a standalone dedicated control channel (SDCCH). The slow associated control channel is assigned to a traffic (voice or data) channel or to a standalone dedicated control channel (SDCCH). The SACCH channel provides power and frame adjustment and control information to the mobile unit.

The frequency correction channel FCH of the broadcast control channel carries information which allows the mobile unit to accurately tune to the base station. The synchronization channel SCH of the broadcast control channel provides frame synchronization data to the mobile unit.

The random access channel RACH is used by the mobiles to request access to the system. The RACH logical channel is a unidirectional uplink channel (from the mobile to the base station or satellite), and is shared by separate mobile units (one RACH per cell is sufficient in typical systems, even during periods of heavy use). Mobile units continuously monitor the status of the RACH channel to determine if the channel is busy or idle. If the RACH channel is idle, a mobile unit desiring access sends its mobile identification number, along with the desired telephone number, on the RACH to the base station or satellite. The MSC receives this information from the base station or satellite and assigns an idle voice channel to the mobile station, and transmits the channel identification to the mobile through the base station or satellite so that the mobile station can tune itself to the new channel. All time slots on the RACH uplink channel are used for mobile access requests, either on a contention basis or on a reserved basis. Reserved-basis access is described in U.S. patent application Ser. No. 08/140,467, now, U.S. Pat. No. 5,420,864 entitled "Method of Effecting Random Access in a Mobile Radio System", which was filed on Oct. 25, 1993, and which is incorporated in this application by reference. One important feature of RACH operation is that reception of some downlink information is required, whereby mobile stations receive real-time feedback for every burst they send on the uplink. This is known as Layer 2 ARQ, or automatic repeat request, on the RACH. The downlink information preferably comprises twenty-two bits that may be thought of as another downlink sub-channel dedicated to carrying, in the downlink, Layer 2 information specific to the uplink. This flow of information, which can be called shared channel feedback, enhances the throughput capacity of the RACH so that a mobile station can quickly determine whether any burst of any access attempt has been successfully received. As shown in FIG. 2, this downlink information is transmitted on channel AGCH.

Transmission of signals in a TDMA system occurs in a buffer-and-burst, or discontinuous-transmission, mode: each mobile unit transmits or receives only during its assigned time slots in the TDMA frames on the mobile unit's assigned frequency. At full rate, for example, a mobile station might transmit during slot 1, receive during slot 2, idle during slot 3, transmit during slot 4, receive during slot 5, and idle during slot 6, and then repeat the cycle during succeeding TDMA frames. The mobile unit, which may be batterypowered, can be switched off (or "sleep") to save power during the time slots when it is neither transmitting nor receiving.

To increase mobility and portability, radiocommunication subscribers tend to prefer mobile units having a relatively small, omnidirectional (and accordingly, less powerful) antenna over mobile units having a large or directional antenna. Because of this preference, it is sometimes difficult to provide sufficient signal strength for the exchange of communication signals between typical mobile units having a small, omnidirectional antenna and a mobile switching center (MSC) or satellite. This problem is particularly serious in satellite-based mobile radiocommunications.

A satellite-based mobile radiocommunication system provides radiocommunication services to particular geographical areas of the earth using one or more partially overlapping satellite beams. Each satellite beam has a radius of up to about 1000 KM. Due to the power limitations of a satellite, it is not practical to provide a high link margin in every beam simultaneously.

Because mobile satellite links are severely power limited, communication is typically limited to line-of-sight channels with Ricean fading. Ricean fading occurs from a combination of a strong line-of-sight path and a ground-reflected wave, along with weak building-reflected waves. These channels require a communications link margin of approximately 8 dB or less to achieve voice communication in ideal or near-ideal conditions, such as when the mobile radiotelephone unit antenna is properly deployed and the unit is in an unobstructed location. In these near-ideal channels, the mobile unit can successfully monitor the paging channel to detect incoming calls. In non-ideal conditions, such as when the mobile unit antenna is not deployed or the mobile unit is "shadowed" due to obstructions (e.g., buildings, trees, etc.) reflected waves, including ground-reflected and building-reflected waves, become significant. The channels in these non-ideal conditions are characterized by flat Rayleigh fading (the most severe type of fading) with severe attenuation. In such channels, a link margin of as much as 30 dB or more is required to achieve voice communication, and the mobile unit may have difficulty monitoring the paging channel to detect incoming calls. The term "link margin" or "signal margin" refers to the additional power required to offer adequate service over and above the power required under ideal conditions—that is, a channel having no impairments other than additive white Gaussian noise (AWGN). "Impairments" include fading of signal amplitude, doppler shifts, phase variations, signal shadowing or blockage, implementation losses, and anomalies in the antenna radiation pattern.

It would be desirable to allow a mobile unit to exchange communication signals with more than one satellite to avoid the adverse effects of shadowing. However, in such a satellite diversity scheme, an accurate compensation is difficult to achieve for different satellites having different positions or relative velocities. If a satellite has a nongeostationary orbit, the signal frequency of the communication link between the satellite and a mobile unit suffers from the Doppler effect, which causes the signal frequency to change as the satellite moves. The change in signal frequency can cause signals on one channel to stray into another channel. In addition, the distance between each mobile unit and the satellite, and therefore the propagation delay, varies considerably. This propagation delay can cause signals to arrive at the satellite in incorrect time slots. To counteract the Doppler effect and propagation delay, the expected Doppler shift must be determined based on the satellite position and the relative velocity between a mobile unit and the satellite. The expected Doppler shift and propagation delay are used to compensate the transmitted signal to ensure that the signals transmitted to the satellite arrive in the appropriate TDMA timeslots and at the correct frequency.

One solution is to restrict the satellite diversity scheme to mobile units located relatively close together. In this case, each satellite will experience the same Doppler effect and the same propagation delay from each mobile unit, so that the signals from each mobile unit will arrive at an appropriate signal frequency and in an appropriate time slot.

A system has been proposed in which mobile units assigned adjacent frequencies in a FDMA system, or alternatively mobile units assigned adjacent time slots on a TDMA carrier, are physically adjacent. The proposed system may be implemented by mapping the one dimensional time or frequency axis to the two dimensional surface of the earth served by the satellites. Alternatively, the two dimensional time-frequency plane is mapped to the two-dimensional traffic service area.

It would be desirable for a mobile communication system to allow a transmitter/receiver, such as a mobile unit, to exchange communication signals with multiple control station, such as satellites, to avoid the effects of shadowing, which does not limit the location of the transmitter/receivers and which does not require a complicated mapping procedure.

SUMMARY OF THE INVENTION

The above-noted and other limitations of conventional communication systems and methods are overcome by the present invention, which provides for a diversity scheme in which, for example, a mobile unit in a satellite-based communications system selectively communicates with multiple satellites. Specifically, the mobile unit communicates with a first satellite using active time slots of a TDMA communications link, while scanning for a control channel of a second satellite during the idle time slots of the TDMA link. If a control channel of a second satellite is detected, the mobile unit stores the synchronization information from the control channel, and continues to monitor the control channel during the idle time slots while communicating with the first satellite during the active time slots. If the signal quality of the communication link with the first satellite falls below a first threshold level, as a result of shadowing or other interference, and the signal quality of a communication link with the second satellite would be above a second threshold level, the mobile unit establishes a communication link with the second satellite and stores the synchronization information from the first satellite. The mobile unit can monitor the control channel from the first satellite, or can scan for the presence of control channels from other satellites.

If the signal quality of the communication links between the mobile unit and each of the satellites is sufficient, or while the mobile unit is making the transition between satellites, the mobile unit can simultaneously communicate with each satellite, using active time slots in alternate TDMA frames.

BRIEF DESCRIPTION OF THE DRAWINGS

The foregoing objects, features and advantages of the present invention will be more readily understood upon reading the following Detailed Description of Preferred Embodiments in conjunction with the accompanying drawings in which.

DETAILED DESCRIPTION OF PREFERRED EMBODIMENTS

While the following description is directed toward a diversity scheme implemented in a radiocommunication system having transmitter/receivers, such as mobile units, and control stations, such as base stations or satellites, it will be appreciated that the principles of the present invention can also be applied to other types of communication systems.

Figure 3:
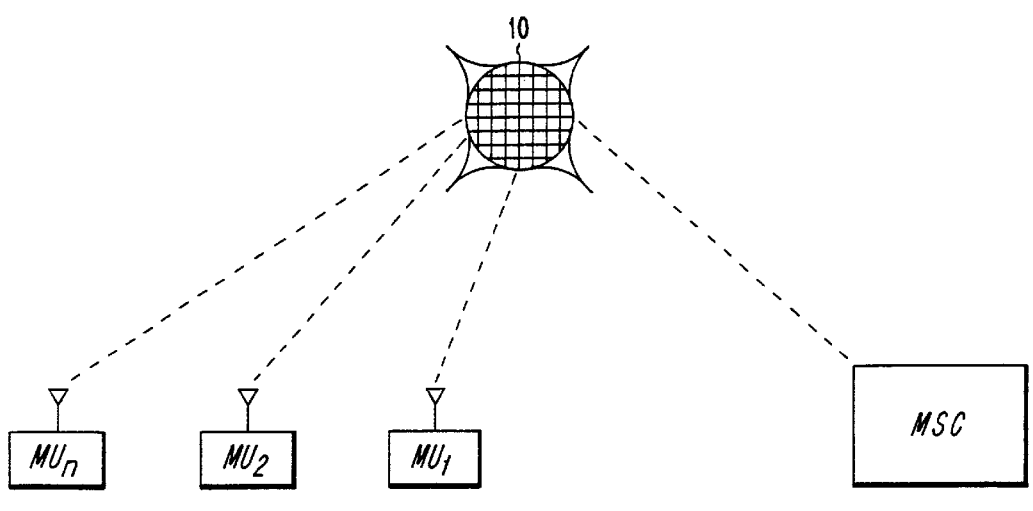
FIG. 3 is a diagram of a satellite-based mobile radiocommunication system in which the diversity scheme of the present invention may be implemented.

In a satellite-based mobile radiocommunication system, a communication link for transmitting voice or data is established between a mobile station and either a standard telephone or a second mobile station through one satellite, multiple satellites, or a combination of one or more satellites and the PSTN (public switched telephone network). Such a system, as shown in FIG. 3, may be desirable to achieve a broad geographical coverage in which few or no base stations are present, and additional base stations are not practical, such as in rural areas. Due to the inherent power limitations of satellites, voice communications links between the satellite and the mobile station require ideal or near-ideal conditions; that is, conditions such as line-of-sight communication with the mobile station's antenna properly deployed. In non-ideal conditions, such as when the mobile station is shadowed (e.g., inside a building, etc.) or when the mobile antenna is not properly deployed, the power or signal margin requirements for communication increases significantly due to the increased attenuation in the channel. In such situations (shown as MUz in FIG. 3), Rayleigh fading often prevents satisfactory communication, and it is therefore desirable to allow the mobile unit to communicate through a second satellite. The present invention provides for such a satellite diversity scheme.

For purposes of illustration only, and without limiting the scope of the invention, a satellite-based GSM radiocommunication system using TDMA channels may be assumed to exhibit the following conditions. The communication channel has no line of sight component and is subject to flat Rayleigh fading with severe attenuation. As will be appreciated by those of skill in the art, Rayleigh (or multipath) fading is a phenomenon which occurs when multipath waves form standing-wave pairs due to reflection from the physical structures in a service area. The standing-wave pairs summed together form an irregular wave fading structure. When the mobile unit is stationary, it receives a constant signal. However, when the mobile unit is moving or shadowed, the fading structure causes fading to occur which increases as the mobile unit moves faster. The mean signal level of the non-ideal Rayleigh channel is approximately 10–30 dB below the signal level of a near-ideal line-of-sight channel.

Figure 4:
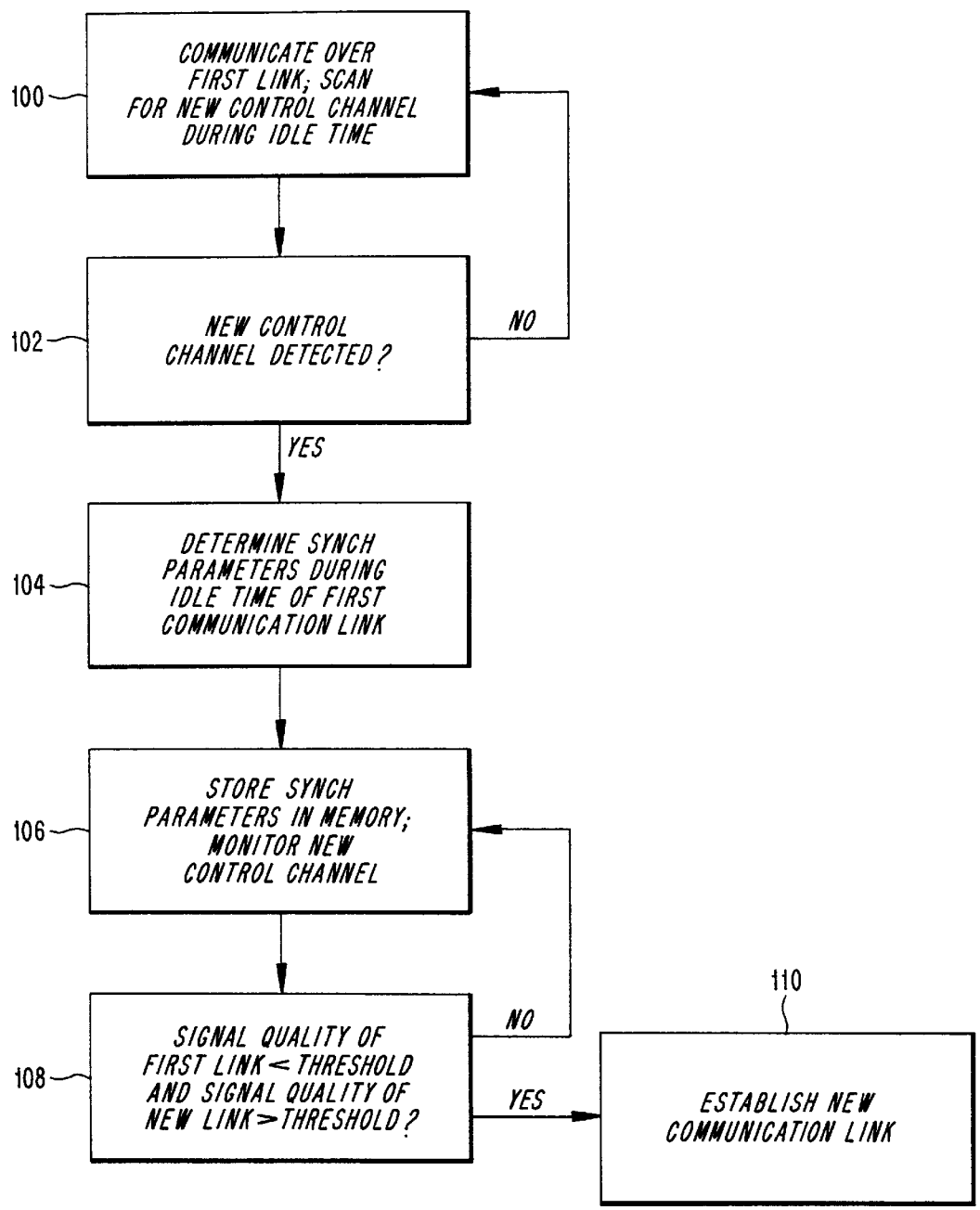
FIG. 4 is a flow chart describing the transmission of communication signals according to an embodiment of the present invention.

Referring to FIG. 4, a flow chart describing the diversity scheme of the present invention is shown. In step 100, a mobile unit has established a communication link with a first satellite, and the mobile unit exchanges communication signals with the satellite over the first communication link. The mobile unit can be any portable radiocommunication transmitter/receiver, and the communication link is preferably a TDMA link in which each TDMA frame includes, for example, 8 time slots. In step 100, the mobile unit transmits communication signals using active time slot n and receives communication signals on active time slot m of a TDMA frame. During the idle time of the communication link (the idle time slots of each TDMA frame), the mobile unit scans for new control channels from other satellites. The mobile unit performs the scanning operation of step 100 regardless of the signal quality of the communication link with the first satellite.

In step 102, during the idle time slots of the first communication link, the mobile unit determines whether a new control channel from a second satellite is present, and the mobile unit continues to exchange communication signals with the first satellite over the active time slots of the first communication link established in step 100. If no new control channel is detected, the process repeats step 100. If a new control channel is detected, the process proceeds to step 104. In step 104, during the idle time of the first communication link, the mobile unit determines, from the control channel detected in step 102, the synchronization parameters necessary to establish a communication link with the second satellite. The mobile unit continues to exchange communication signals with the first satellite over the active time slots of the first communication link established in step 100.

In step 106, the mobile unit stores the synchronization parameters determined in step 104 in a memory, and continues to monitor the new control channel of the second satellite during the idle time of the first communication link, while exchanging communication signals with the first satellite over the active time slots of the first communication link.

Once the mobile unit has determined the synchronization parameters necessary to establish a communication link with the second satellite in step 104, the mobile unit is capable of exchanging communication signals with the second satellite. However, the mobile unit continues to exchange communication signals with the first satellite on the active time slots of the first communication link as long as the signal quality of the first communication link exceeds a first threshold level.

In step 108, the mobile unit determines if the signal quality of the first communication link has fallen below the first threshold level (for example, due to shadowing) and the signal quality of a second communication link with the second satellite would be above a second threshold level. If both of these conditions are met, the mobile unit establishes the second communication link in step 110; otherwise, the process returns to step 106, and the mobile unit continues to monitor the new control channel. Once the second link is established, the mobile unit exchanges communication signals on active time slots of the second communication link and stops exchanging communication signals over the first communication link.

After step 110, during the idle time slots of the second communication link, the mobile unit can store the synchronization parameters for the first communication link in the memory and monitor the control channel from the first satellite or can scan for control channels of other satellites. If the mobile unit scans for the control channel of a third satellite, the process returns to step 102, and the third satellite's synchronization parameters are stored in the mobile unit's memory upon detection, as described above. If the mobile unit stores the synchronization parameters from the first communication link, the process returns to step 106, and the mobile unit monitors the control channel of the first satellite during the idle time of the second communication link. That is, the first satellite becomes the "new" satellite. If the signal quality of the second communication link falls below a threshold level, and the signal quality of a communication link with the first satellite or a third satellite exceeds the threshold level, the mobile unit establishes a new communication link with the first or third satellite.

Alternatively, the mobile unit may exchange communication signals with two satellites substantially simultaneously, either during the transition between two communication links or in situations where the communication links with both satellites offer sufficient signal quality. To implement this alternative, the mobile unit communicates with the first satellite during active time slots of one set of TDMA frames, such as the set of even-numbered TDMA frames, and communicates with the second satellite during active time slots of an alternate set of TDMA frames, such as the set of odd-numbered TDMA frames. It will be appreciated that by allowing the mobile unit to transmit signals to two different satellites, the separate transmissions can be integrated at a ground or base station to increase the effective signal margin. A margin gain of approximately 3 dB can be achieved using this alternative.

Figure 1:
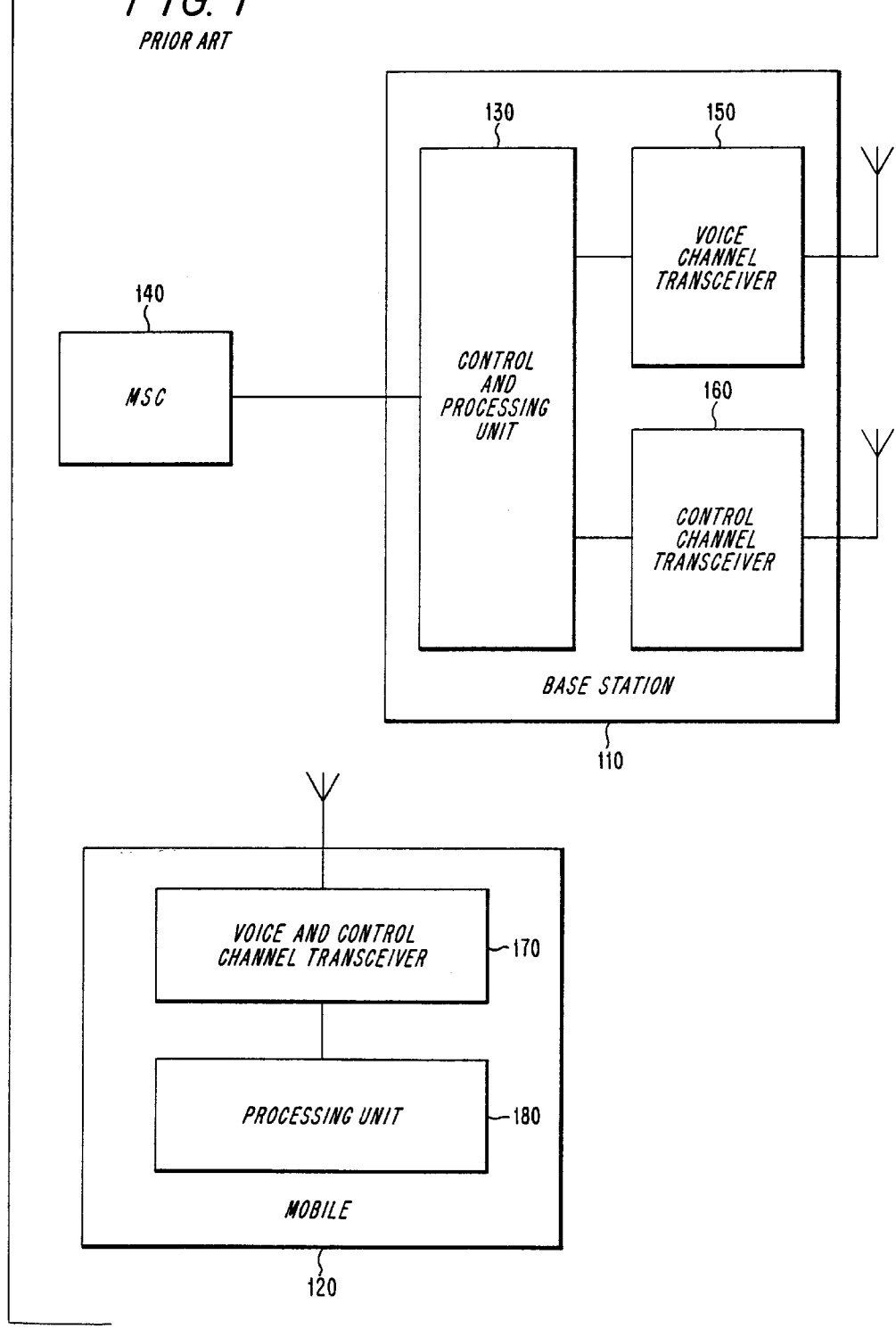
FIG. 1 is a block diagram of an exemplary mobile radiocommunication system.
Figure 2:
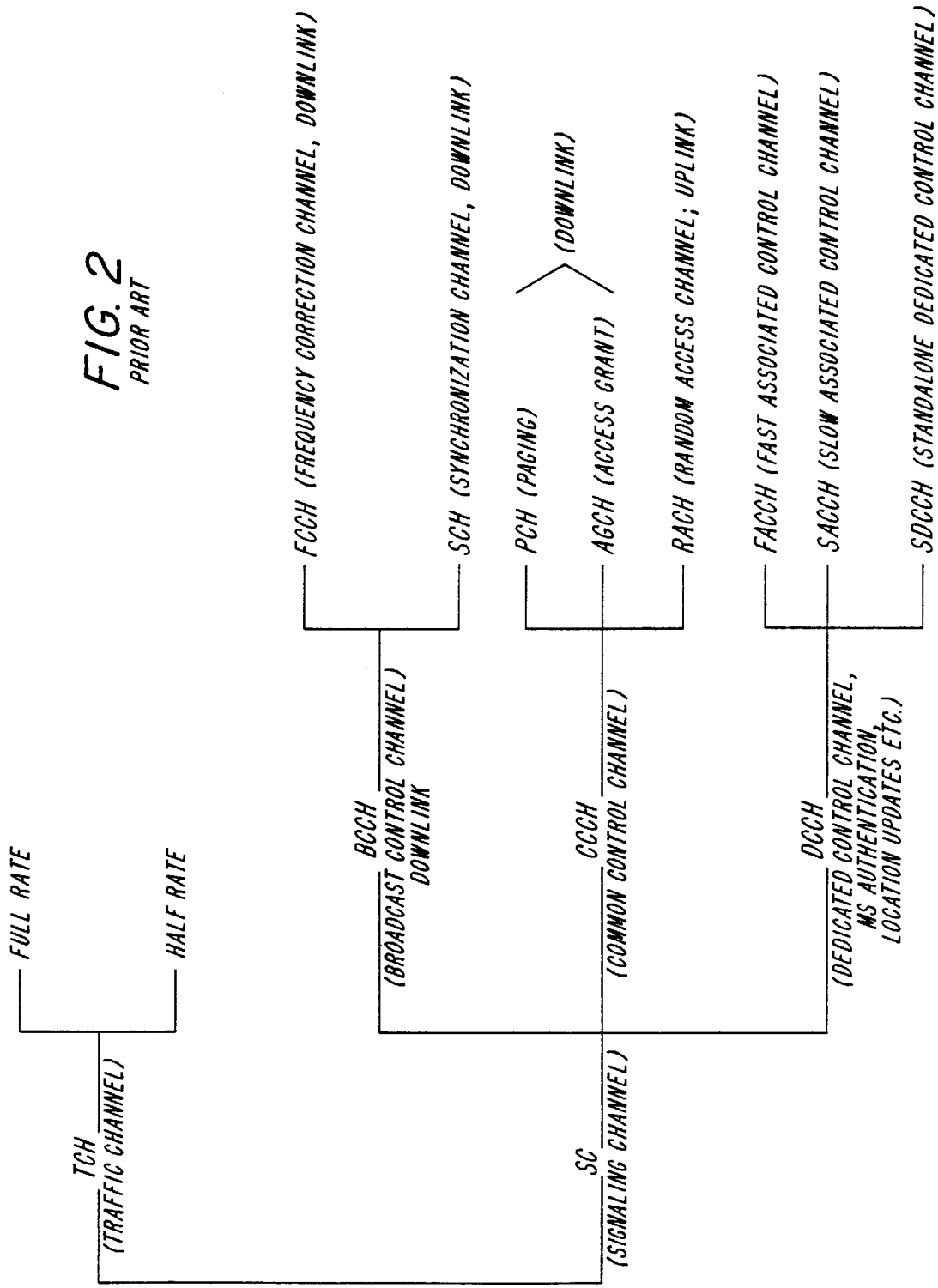
FIG. 2 is a diagram showing the organization of channels in a typical GSM digital radiocommunication system.

It will be appreciated that the diversity scheme of the present invention can be implemented in a radiocommunication system having a transmitter/receiver, such as a mobile radiocommunication unit, and a control station, such as a satellite, having the general characteristics shown in FIG. 1.

While the foregoing description has included many specificities, the exemplary embodiments disclosed are for illustrative purposes only, and are not limiting of the present invention. Many modifications will be readily apparent to those of ordinary skill in the art which do not depart from the spirit and scope of the invention, as defined by the appended claims and their legal equivalents.

What is claimed is:

1. A method for communicating between a transmitter/receiver and a first and second control station, the first and second control stations having respective first and second control channels associated therewith, the method comprising the steps of:

establishing communications between the transmitter/receiver and the first control station over a first communication link;

scanning, by the transmitter/receiver, for a new control channel;

determining whether the new control channel has been detected, wherein the detected new control channel is the second control channel;

determining synchronization parameters for communication with the second control station over a second communication link from the second control channel while exchanging communication signals with the first control station;

storing the synchronization parameters at the transmitter/receiver while maintaining communications between the transmitter/receiver and the first control station while exchanging communication signals with the first control station;

monitoring a signal strength associated with the first and second communication links at the transmitter/receiver; and establishing communications with the second control station over the second communication link if the signal strength of the first communication link falls below a first threshold level and the signal strength of the second communication link is greater than a second threshold level.

2. The method of claim 1, wherein the transmitter/receiver is a mobile radiocommunication unit.

3. The method of claim 1 wherein the first and second control stations are radiocommunication satellites.

4. The method of claim 1, wherein the first and second control stations are terrestrial base stations.

5. The method of claim 1, wherein the first and second communication signals are TDMA communication signals.

6. The method of claim 1, wherein the characteristics include signal strength.

7. The method of claim 6 wherein the step of determining whether to establish communications with the second control station further comprises the step of:

comparing the signal strength of the first communication link with a first threshold level.

8. A transmitter/receiver for exchanging communication signals over a communication link, comprising:

means for establishing a first communication link with a first control station;

means for scanning for a new control channel while maintaining communications with said first control station;

means for determining whether a new control channel has been detected;

means for determining and storing synchronization parameters for communication with a second control station during an interval when the first communication link is established and maintained;

means for determining a first signal strength of the first communication links and a second signal strength of the second communication channel; and means for establishing a second communication link with the second control station based on comparisons of said first and second signal strengths to first and second thresholds respectively.

9. The transmitter/receiver of claim 8, wherein the transmitter/receiver is a mobile radiocommunication unit.

10. The transmitter/receiver of claim 8, wherein the first and second control stations are satellites.

11. The transmitter/receiver of claim 8, wherein the first and second control stations are terrestrial base stations.

12. The transmitter/receiver of claim 8, wherein the communication signals are TDMA communication signals.

13. The transmitter/receiver of claim 8, wherein the characteristics include signal strength.

14. The transmitter/receiver of claim 13, wherein the means for establishing a second communication link further comprises:

means for comparing the signal strength of the first communication link with a first threshold level.

15. A transmitter/receiver for exchanging communication signals over a communication link, comprising:

a transceiver which establishes a first communication link with a first control station, wherein the transceiver scans for a new control channel and establishes a second communication link with a second control station while maintaining communications with said first control station; and a processor which determines whether a new control channel has been detected, wherein the processor is operative to:

determine and store synchronization parameters for communicating with the second control station during an interval when the first communication link is established and maintained;

monitor the signal strengths associated with the first and second communication links; and establish a communication link with said second control station if the signal strength of the first communication signal falls below a first threshold level and the signal strength of the second communication link is greater than a second threshold level.

16. The transmitter/receiver of claim 15, wherein the transmitter/receiver is a mobile radiocommunication unit.

17. The transmitter/receiver of claim 15, wherein the first and second control stations are satellites.

18. The transmitter/receiver of claim 15, wherein the first and second control stations are terrestrial base stations.

19. The transmitter/receiver of claim 15, wherein the communication signals are TDMA communication signals.

20. The transmitter/receiver of claim 15, wherein the characteristics include signal strength.

21. The transmitter/receiver of claim 20, wherein the transceiver which establishes a second communication link compares the signal strength of the first communication link with a first threshold level.

22. The method of claim 1 wherein scanning for a new control channel comprises scanning for a new control channel independently of the current signal quality of the first communication link.

23. The transmitter/receiver of claim 8 wherein said scanning means scans for a new control channel independently of the current signal quality of the first communication link.

24. The transmitter/receiver of claim 8 wherein said transceiver scans for a new control channel independently of the current signal quality of the first communication link.

* * * * *